Nov. 22, 1966  K. H. LANGE  3,286,611
PHOTOGRAPHIC CAMERAS
Filed Oct. 2, 1964  2 Sheets-Sheet 1

INVENTOR:
Karl Heinz Lange
BY
Sparrow and Sparrow
ATTORNEYS

INVENTOR:
Karl Heinz Lange
BY
Sparrow and Sparrow
ATTORNEYS 3,286,611
PHOTOGRAPHIC CAMERAS
Karl Heinz Lange, Bunde-Ennigloh, Westphalia, Germany, assignor to Balda-Kamerawerk Rudolf Grufer, Kommanditgesellschaft, Bunde, Westphalia, Germany, a German company
Filed Oct. 2, 1964, Ser. No. 401,089
Claims priority, application Germany, Oct. 5, 1963, B 73,769
5 Claims. (Cl. 95—11)

This invention relates to photographic cameras, more particularly photographic cameras having built-in flash systems.

Modern cameras are usually required to be usable for flash as well as for daylight work. Originally, the flash equipment was a separate item, but the modern trend is to include the flash equipment as part of the camera. Various constructions have been devised but none is completely satisfactory. In some cases the reflector is too small, while other constructions use the camera top to receive or form the reflector; the difficulty here is that the space available on the top of the camera is required for other purposes. Some forms of fitted flash require the top of the camera to be excessively high, something which is disadvantageous aesthetically. Another disadvantage of the known flash systems is that the direction of illumination is fixed permanently, yet the photographer often requires not to direct his beam straight on to the subject but to direct the beam sideways so that it can be reflected to illuminate the object more from the side and with more reflection.

It is an object of this invention to obviate all these disadvantages of the known systems and to provide a camera with built-in flash which satisfactorily meets all requirements, is convenient to handle and has an aesthetically satisfactory exterior.

The underlying idea of the invention is to arrange the flash system to be outwardly pivotable laterally from the camera casing, so that it is unnecessary to do anything with the top of the camera. Indeed, fitting the flash on the side of the camera means that the top of the camera can be elongated laterally, something which is very useful, for instance, to provide a wide base for range finding and to enable more space to be found for auxiliary devices.

Preferably, the reflector of the flash system is the same height as the camera casing, is mounted for pivoting around a vertical pivot axis between the camera top part and the camera base, and has external dimensions such as, when in the pivoted-in position, to close the camera casing.

Figure 1:
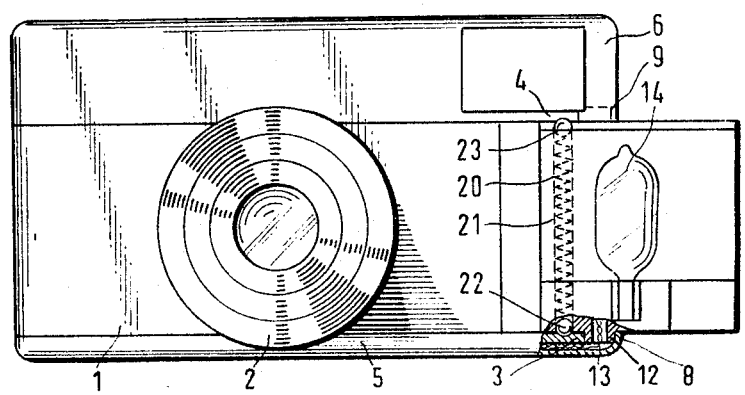
FIGURE 1 is a partly sectioned view in front elevation of one illustrative embodiment of a camera according to the invention with a fitted flash.
Figure 2:
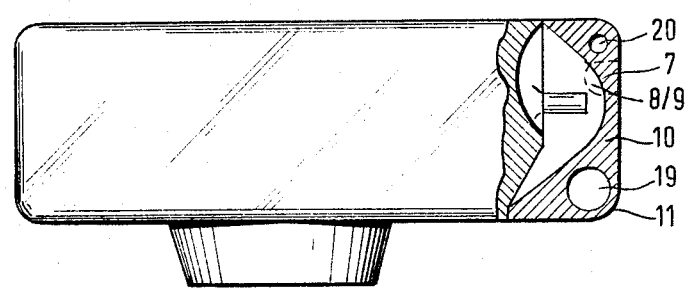
FIGURE 2 is a plan view of the camera of FIGURE 1 partly in section.

Referring to the drawings, a camera casing 1 is fitted with a lens 2, is extended at the top of one side by a horizontal web or the like 4 and is similarly extended at the bottom by a horizontal web or the like 3. The camera has a base member 5 which is recessed to engage around the web 3, and the camera has a top member or cap or the like 6 which engages around the web 4. The webs 3, 4 are each formed with a respective open rectangular slot with a semi-circular end 8, 9 each set back from the transverse centre line of the camera and each having as its centre a point 7. When a backing or a casing 10 for flash equipment is in the pivoted-in position, outside surface 11 of the casing 10 exactly matches the camera contours. Pins or the like 12 are disposed at the top and bottom of the reflector along the axis 7 respectively engaged in slots 8 and 9. One or both of the pins 12 is or are formed with a passage 13 for the electric wiring for the flash. A flash bulb 14 can be fitted from the front between top spring contacts 15, 16 which retain the bulb 14 in a parabolic reflector 17.

Figure 3:
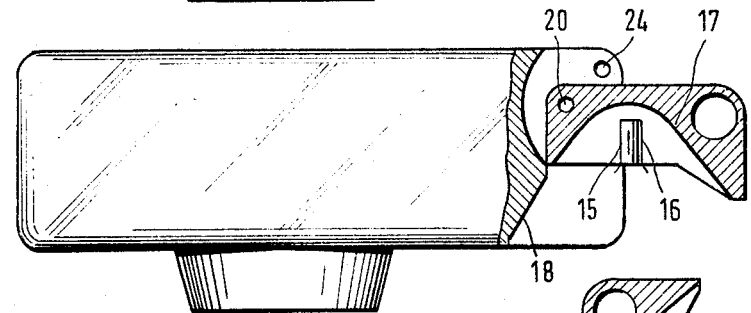
FIGURE 3 is a view similar to FIGURE 2 but with the reflector turned into a position at right-angles to the position shown in FIGURE 2 so that the reflector axis and the optical axis of the camera extend parallel with one another.

As the drawings also show, the pivot point or axis 7 is offset laterally from the principal axis of the reflector. The two parabolic arms of the reflector 17 are of different lengths from one another, the pivot point 7 being offset towards the shorter arm. When the device is in the operative position shown in FIGURE 3, the shorter arm of the parabolic can be extended by a reflector surface 18 of the casing 1. However, this feature is not always necessary nor even desirable. A lateral shift or widening of the light due to the mounting of the flash on the side of the camera may, indeed, occasionally be very advantageous, and an asymmetrical reflector is very advantageous more particularly for photographs with the flash system in the position shown in FIGURE 4. For instance, in this position (for upright prints) can be taken by directing the flash against white ceilings, so that the resulting photographs have strong indirect lighting.

Adaptation of the external diemnsions of the flash casing 10 to camera casing dimensions means that there is behind the reflector 17 a space which is, conveniently, available for electrical items for the flash lamp, such as a capacitor 19.

Figure 4:
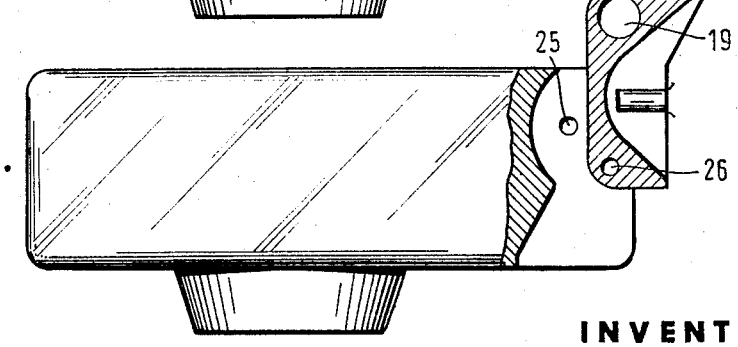
FIGURE 4 is another view similar to FIGURE 2 but with the reflector pivoted through 180° from the position shown in FIGURE 2 so that the reflector axis extends perpendicularly to the optical axis of the camera.

In or near the web or the like 4 is a passage 20 receiving a compression spring 21 which forces balls 22, 23 out from the passage 20. The webs 3, 4 are formed on their inside, to match the passage 20, with locating recesses 24–26 for the balls 22, 23, to locate the reflector in a number of preferred positions. Of course, intermediate positions can be located similarly. If the position shown in FIGURE 4 is not required, then of course, a bistable spring can be provided to move the flash into one of the two end positions. Also, a torsion or tension spring can be provided to return the flash lamp automatically to the operative position upon the removal of an appropriate bolt (not shown); similarly, a locking mechanism, which is more particularly automatic, can be provided to keep the flash lamp in the inoperative or closed position.

Figure 5:
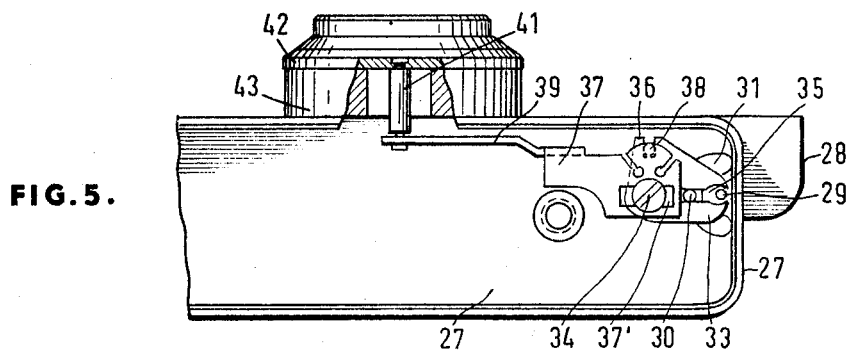
FIGURE 5 is an inverted plan view, with the base member removed, of a second illustrative embodiment of a camera comprising coupled range finding equipment which operates automatically in dependence upon reflector position.
Figure 6:
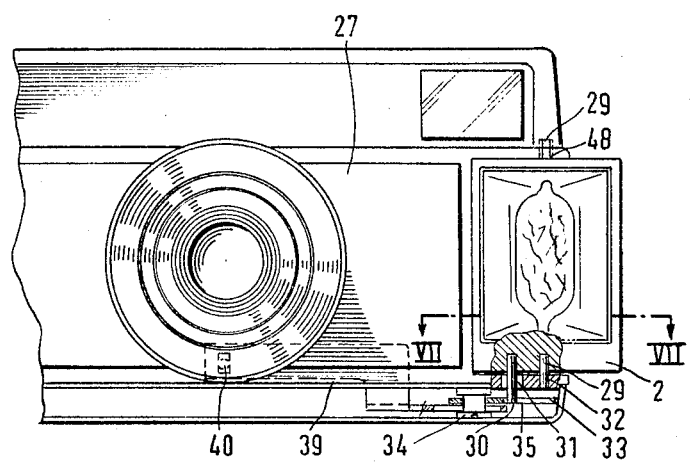
FIGURE 6 is a front elevation, with some parts broken away, of the camera shown in FIGURE 5.

Referring now to FIGURES 5 and 6, a reflector casing 28 is mounted on the side of a camera casing 27 for pivoting laterally around pivots 29. As in the embodiment shown in FIGURES 1–4, the reflector can be brought into at least three pivoted positions: one for daylight photography, one for direct flash lighting and the third for indirect flash lighting. A pin 30 is rigidly anchored in the base of the casing 28 or is pressed into such casing and extends downwards through a semi-annular aperture 31 in a camera wall 32. A lever 33 is pivotally mounted on a screw 34 on camera wall 32 and is formed with two slots 35, 36 disposed substantially at right-angles to one another. The slot 35 so co-operates with the pin 30—i.e., with the reflector casing 28—that rotation of the casing 28 causes the lever 33 to pivot correspondingly. A slider 37 is displaceably mounted on the screw 34.

A pin 38 is preferably press-fitted into slider 37, which pin cooperates with the slot 36 in the lever 33. The slider has an elongated end 39 having a slot 40 therein, which engages a pin 41 on an exposure-time adjusting ring 42 of a shutter 43, to adjust the exposure time thereof to the reflector position. Of course, other adjustments, for instance, of the diaphragm aperture and so on, for adapting the automatic shutter system to reflector position can be performed via the pin 41 and ring 42.

Figure 7:
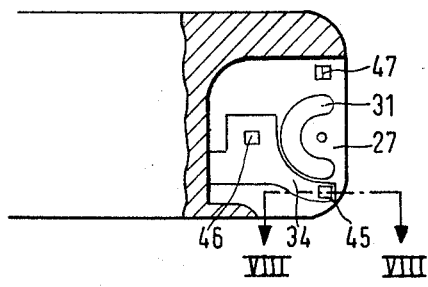
FIGURE 7 is a section taken along the line VII–VII of FIGURE 6.
Figure 8:
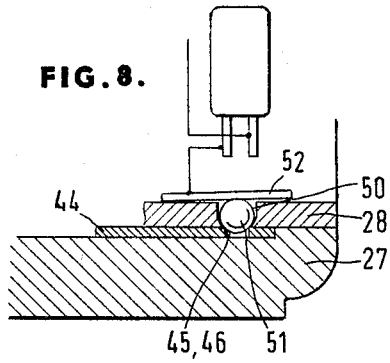
FIGURE 8 is a section, taken along the line VIII–VIII of FIGURE 7, through a contact strip or track at a locating or click-stop position.

The contact system shown in FIGURES 7 and 8 is provided to switch the flash lamp on and off correctly in the various reflector positions. For contacting and locating a contact strip 44 which is disposed on the bottom of the reflector casing 28 and which is formed with rectangular or round apertures 45, 46 co-operates with a similar aperture 47 in the preferably plastics casing 27. The same has a top wall 48 which bounds the zone for the reflector casing 28, and the wall 48 has the same arrangement as the contact strip 44 and associated apertures, but in laterally inverted form.

A combined locating ball and contact ball 51 is resiliently mounted, one at the top and one at the bottom, in holes 50 in the casing 28. Spring contacts 52 bias the two balls 51, only the lower of which is shown in FIGURE 8. The contacts 52 are so shaped as to provide a connection from one flash lamp contact to the bottom ball 51 and similarly from the other flash lamp contact to the top ball 51 (not shown). The contact strips 44 ensure that the reflector casing is located in the two positions for direct flash and indirect flash and that only in these two positions is the flash lamp electrically connected to the other parts of the flash circuit in the camera. With the camera set to "daylight," therefore, the user need not worry whether or not there is a flash lamp in the flash lamp holder, and he can be sure that, when the flash lamp system is in the position for direct flash or indirect flash, the flash lamp is connected up electrically.

I claim:
1. A photographic camera including:
   (a) a camera casing;
   (b) a movable flash reflector having substantially the same height as said casing;
   (c) a backing for said reflector shaped to form in one position a flush closure with said camera casing, said backing having a passage therethrough;
   (d) top and bottom balls disposed in said passage in said backing;
   (e) a compression spring disposed in said passage between said balls;
   (f) top and bottom webs extending said casing laterally on one side of said camera, said webs having aligned locating recesses for receiving said balls when said reflector is in predetermined positions from said one position;
   (g) free terminal edges of said webs having aligned slots therein set rearwardly of said camera;
   (h) tubular bearing pins on said reflector engaged in said slots; and
   (i) camera top and base members extending over and under said top and bottom webs respectively to retain said bearing pins in said aligned slots.
2. A photographic camera including:
   (a) a camera casing;
   (b) a movable flash reflector having substantially the same height as said casing;
   (c) a backing for said reflector shaped to form in one position a flush closure with said camera casing;
   (d) an exposure time adjustment ring;
   (e) a lever formed at the periphery of said ring having two slots mutually at right angles;
   (f) pivot means for said lever;
   (g) a first connecting pin on said reflector engaged in the first slot of said lever;
   (h) a slider coupled with said exposure time adjusting ring; and
   (i) a second connecting pin on said slider engaged in the second slot of said pivoted lever.
3. A photographic camera including:
   (a) a camera casing;
   (b) a movable flash reflector having substantially the same height as said casing;
   (c) a backing for said reflector shaped to form in one position a flush closure with said camera casing;
   (d) top and bottom flanges on said backing having aligned holes therethrough;
   (e) top and bottom contacting and locating balls received respectively in said holes in said top and bottom flanges;
   (f) contact strips on said camera casing above and below said top and bottom flanges respectively of said backing, said contact strips having recesses therein for receiving said balls when said reflector is in predetermined positions rotated from said one position; and
   (g) resilient flash lamp contacts forcing said balls into said holes in the said top and bottom flanges of said backing.
4. A photographic camera comprising:
   (a) a camera casing;
   (b) a movable flash reflector;
   (c) a backing for said reflector shaped to form in one position a flush closure with said camera casing;
   (d) pivot means mounting said reflector on one side of said casing whereby said reflector can be rotated from said one position to expose said reflector;
   (e) an exposure time adjustment ring;
   (f) operating means to operate said exposure time adjustment ring according to the angular rotation of said reflector from said one position;
   (g) flash lamp contacts; and
   (h) adjusting means for adjusting said contacts according to said angular rotation of said reflector from said one position.
5. A photographic camera comprising:
   (a) a camera casing;
   (b) a flash reflector having substantially the same height as said casing;
   (c) said reflector having long and short arms;
   (d) a backing for said reflector shaped to form in one position a flush closure of the camera casing;
   (e) top and bottom webs extending said casing laterally on one side of the camera;
   (f) free terminal edges of said webs having aligned slots therein set rearwardly of the camera;
   (g) bearing pins on said reflector engaged in said aligned slots;
   (h) camera top and base members engaged respectively over and under said top and bottom webs to retain said bearing pins in said aligned slots; and
   (i) each of said bearing pins being tubular to allow the passage of electrical wiring therethrough.

References Cited by the Examiner
UNITED STATES PATENTS

| | | | |
|---|---|---|---|
| 3,051,066 | 8/1962 | Laureau | 95—11.5 |
| 3,127,824 | 4/1964 | Williams | 95—11 X |
| 3,204,542 | 9/1965 | Strasser | 95—11 |

JOHN M. HORAN, *Primary Examiner.*